(12) United States Patent
Fairbanks

(10) Patent No.: US 6,894,462 B1
(45) Date of Patent: May 17, 2005

(54) RATIO ADAPTIVE GATED OSCILLATOR

(75) Inventor: John P. Fairbanks, Roseville, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 10/322,807

(22) Filed: Dec. 17, 2002

(51) Int. Cl.[7] .................................. G05F 1/10
(52) U.S. Cl. ................. 323/222; 323/282; 323/284; 323/288
(58) Field of Search ................. 323/222, 223, 323/265, 282, 284, 288, 299, 349, 350, 351

(56) References Cited

U.S. PATENT DOCUMENTS 6,275,018 B1  8/2001  Telefus et al. ............. 323/282
6,593,725 B1 * 7/2003  Gallagher et al. .......... 323/284

* cited by examiner

*Primary Examiner*—Gary L. Laxton
(74) *Attorney, Agent, or Firm*—Darby & Darby PC; John W. Branch

(57) ABSTRACT

The present invention can be employed with any power supply circuit where it is desirable to employ a ratio adaptive, gated oscillator based step up switching regulator with a selectable duty cycle. By selecting a particular value for a capacitor coupled between the regulator's Frequency and Switch pins, a user can optimize the regulator's duty cycle for a particular application. Also, by adding a resistor in series with the capacitor, a time constant is created that limits the total charge transfer from taking place at high frequencies more than it does at low frequencies. Additionally, by selecting particular values for the capacitor and resistor, the user can adjust the duty cycle for an application as a function of the battery voltage and output voltage.

17 Claims, 4 Drawing Sheets

RATIO ADAPTIVE GATED OSCILLATOR

BACKGROUND OF THE INVENTION

Historically, battery powered devices such as digital cameras and the like have employed step up switching regulators to provide power to their electronic circuitry. However, although the available battery voltage has not significantly increased, the need for power has increased as features have multiplied for many of these devices. Thus, it is desirous to provide an efficient step up DC—DC switching regulator that can handle significantly more power for low input voltage systems such as battery powered devices and the like.

DETAILED DESCRIPTION OF THE PREFERRED EMBODIMENT

Figure 1:
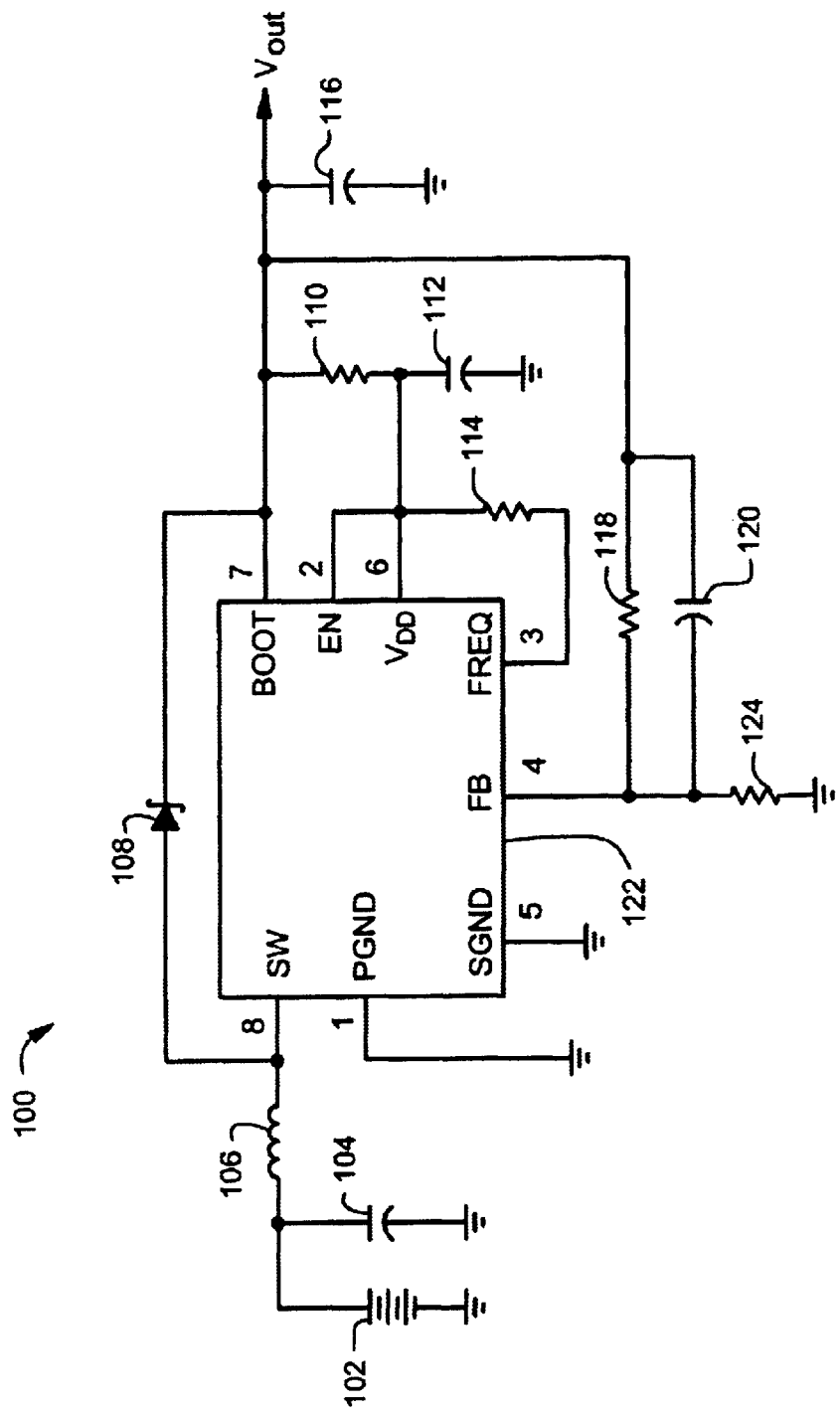
FIG. 1 is a schematic diagram of a step up DC—DC switching regulator configured with electronic components.

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected, or an indirect connection through one or more passive or active intermediary devices. The term "circuit" means either a single component or a multiplicity of components, either active and/or passive, that are coupled together to provide a desired function. The term "signal" means at least one current, voltage, or data signal.

The present invention can be employed with any power supply circuit where it is desirable to employ a ratio adaptive, gated oscillator based step up switching regulator with a selectable duty cycle. By selecting a particular value for a capacitor coupled between the regulator's Frequency and Switch pins, a user can optimize the regulator's duty cycle for a particular application. Also, by adding a resistor in series with the capacitor, a time constant is created that limits the total charge transfer from taking place at high frequencies more than it does at low frequencies. Additionally, by selecting particular values for the capacitor and resistor, the user can adjust the duty cycle for an application as a function based on the battery voltage.

Generally stated, when the SW (switch) pin on the regulator is pulled low (regulator's output transistor is on), a capacitor coupled between the SW pin and a FREQ (frequency) pin draws current out of the oscillator through the FREQ pin which in turn causes the oscillator to slow down. Similarly, when the SW pin goes high (regulator's output transistor is off), the same capacitor drives current back into the oscillator through the FREQ pin which in turn causes the oscillator to speed up. The charging/discharging of the capacitor causes the on time to lengthen and the off time to decrease for the oscillator, which in turn enables the regulator to increase the duty cycle as the input voltage is reduced (typically due to the battery running down). This allows the circuit to generate a relatively constant power output as the battery runs down. It also prevents the peak currents in the inductor from getting too high when the voltage increases, thereby reducing the inductor cost.

Figure 2:
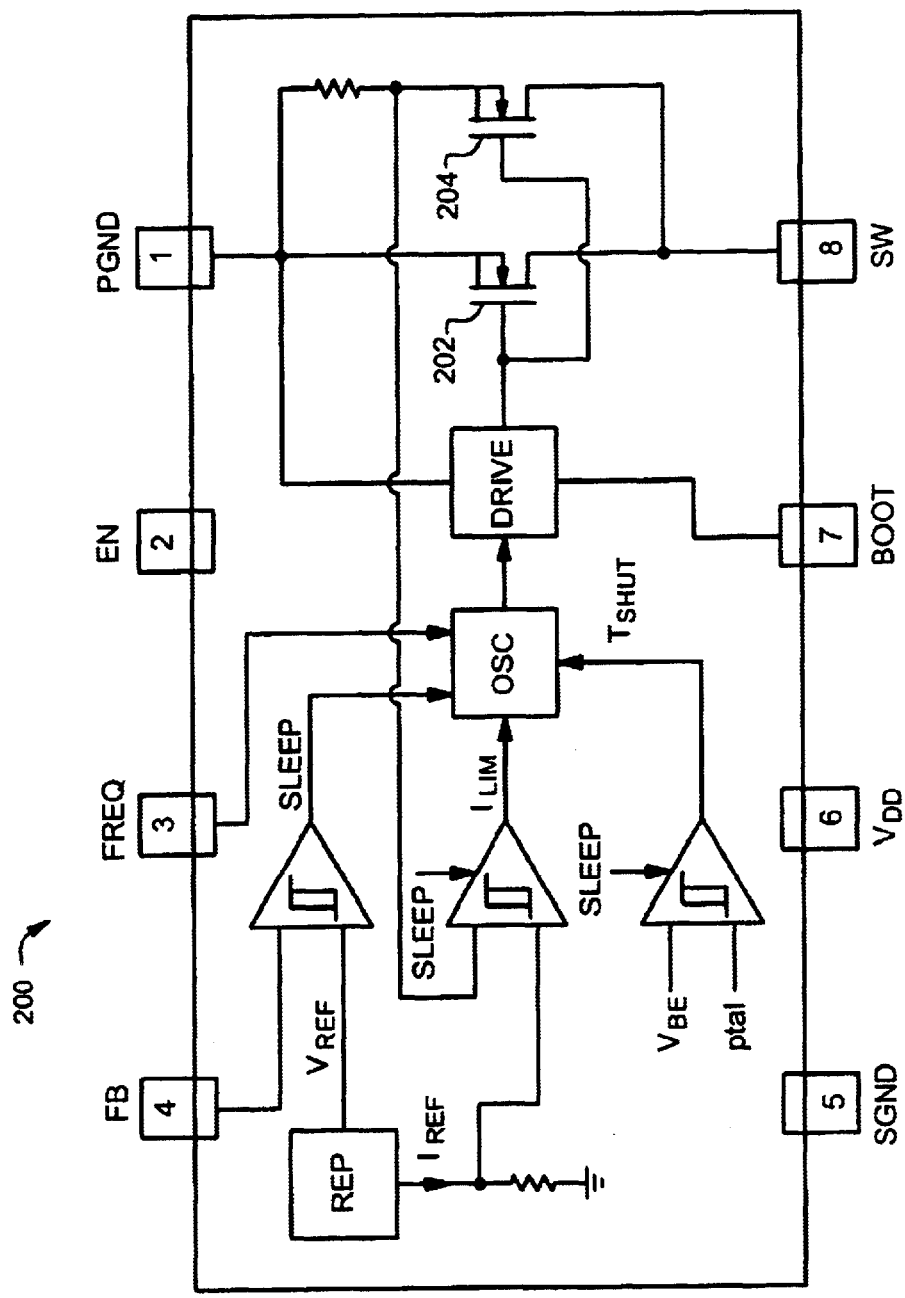
FIG. 2 is a functional block diagram of the components included within a step up DC—DC switching regulator.

The configuration and operation of an exemplary regulator as shown in FIGS. 1 and 2 is described in greater detail in a specification data sheet, dated February 2000, for National Semiconductor's® Part Number LM2621, which discusses a low input voltage, step up DC—DC converter. This specification data sheet is hereby incorporated by reference herein. However, it is understood that the invention is not limited to any particular embodiment of a regulator such as the one shown in the data sheet. Instead, the invention is employable with any one of a number of different regulators that perform substantially the same functions as the LM 2621, but without its relatively large hysteresis that adversely effects the operation of the invention.

FIG. 1 illustrates a schematic diagram of an overview 100 of step up DC—DC switching regulator 122 that is configured to operate with several electronic components. One end of battery 102 is coupled to ground and another end is coupled to an end of capacitor 104 and an end of inductor 106. The other end of capacitor 104 is coupled to ground and the other end of inductor 106 is coupled to a SW (switch) pin of regulator 122. The anode of diode 108 is also coupled to the SW pin and the cathode of the diode is coupled to the BOOT pin of regulator 122. Further, the PGND and SGND pins of regulator 122 are tied to ground.

An end of capacitor 116 is coupled to ground and the other end is coupled to the BOOT pin of regulator 122. The BOOT pin is also coupled to an end of resistor 110 whose other end is coupled to the VDD pin of regulator 122 and an end of capacitor 112. The other end of capacitor 112 is coupled to ground. The VDD pin is coupled to the EN pin and the EN pin is also coupled to an end of resistor 114 whose other end is coupled to the FREQ pin of regulator 122.

An end of resistor 124 is coupled to ground and the other end is coupled to the FB pin of regulator 122. An end of capacitor 120 is coupled to the BOOT pin and the other end is coupled to the FB pin. Also, an end of resistor 118 is coupled to the BOOT pin and the other end is coupled to the FB pin of regulator 122.

FIG. 2 is a functional block diagram of a step up DC—DC switching regulator 200. Briefly, as shown, output MOS transistors 202 and 204 are coupled between the SW pin and the PGND pin of regulator 200. Also, the gates of output transistors 202 and 204 are coupled to a Drive module that is coupled to and controlled by an Osc module (Oscillator).

The Drive module is coupled between the PGND pin and the BOOT pin; and the Osc module is coupled to the FREQ pin. Other regulator components are configured as shown in FIG. 2.

Figure 3:
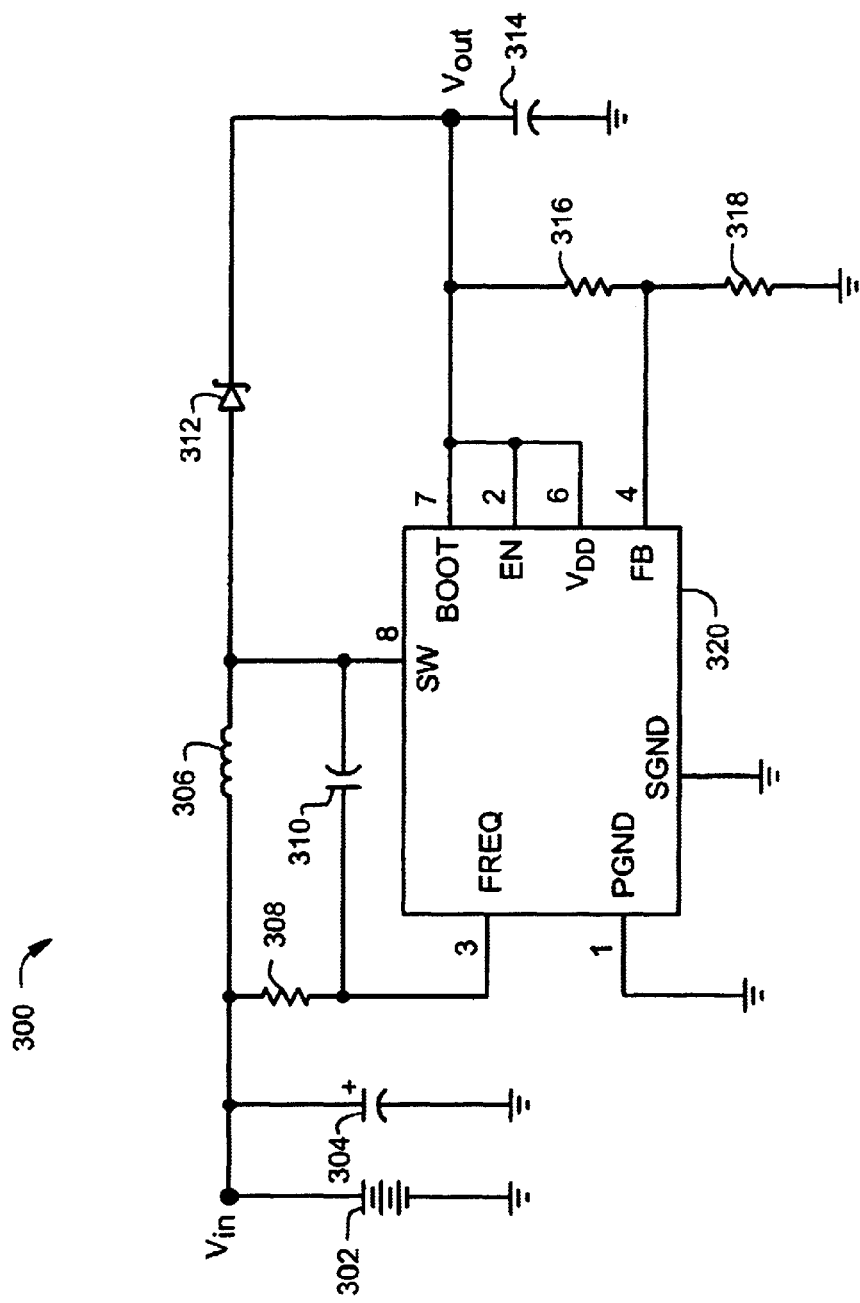
FIG. 3 is another schematic diagram of a step up DC—DC switching regulator that is configured as a ratio adaptive gated oscillator.

FIG. 3 illustrates a schematic diagram of a ratio adaptive gated oscillator based, DC—DC boost converter circuit 300 that can output a high output voltage with relatively low ripple from a varying and relatively low input voltage. For example, by selecting a particular value for capacitor 310, the duty cycle of regulator 320 can be varied from as low as 17% to as high as 90% at operating frequencies ranging from 300 Kilohertz to 2 Megahertz.

As shown, one end of battery 302 is coupled to ground and the other end is coupled to an end of resistor 308 along with an end of capacitor 304 and an end of inductor 306. The other end of capacitor 304 is coupled to ground. The other end of resistor 308 is coupled to the frequency (FRQ) pin of regulator 320 along with an end of capacitor 310. The other end of capacitor 310 and inductor 306 are coupled to the switch (SW) pin of regulator 320. The anode of diode 312 is coupled to the SW pin of regulator 320 and the diode's cathode is coupled to the regulator's BOOT pin. An end of resistor 316 and an end of capacitor 314 are coupled to the BOOT pin of regulator 320. The enable (EN) pin and VDD pin are coupled to the BOOT pin of regulator 320. The other end of resistor 316 and an end of resistor 318 are coupled to the FB pin of regulator 320. The other end of resistor 318 is coupled to ground and the other end of capacitor 314 is coupled to ground. Both the PGND pin and the SGND pin of regulator 320 are coupled to ground Although many electronic devices need 5 volts or more to operate, a typical battery cell often provide 1.5 volts or less. For a single cell battery, the input voltage would need to be increased by a factor of three or more to power many electronic devices. As shown in FIG. 3, a voltage boost can be provided with multiple components including inductor 306 coupled to battery 302 (Vbatt=+1.5 Volt) and the rectifier diode 312 which generate an output voltage of five volts. Also, for the embodiment shown in FIG. 3, the maximum output voltage can be determined by the following equation: Vout/Vin=1+(on time/off time).

Additionally, the duty cycle for regulator 320 can be determined by the "on time" of the regulator's oscillator divided by both its "on time" and "off time", i.e., On Time/(On Time+Off Time).

The FRQ pin feeds a linear current controlled oscillator substantially similar in operation to the oscillator shown in FIG. 2, albeit different in other ways. In particular, the voltage at the FRQ pin stays relatively constant at about 1.1 volts for almost any input current. Also, for a relatively constant Vin, resistor 308 produces a very constant frequency when capacitor 310 is "open". By coupling capacitor 310 between the FRQ and SW pins, the signal from the SW pin is fed back to the FRQ pin.

When the system is supplying a relatively constant voltage and the FRQ pin is at a relatively constant voltage, capacitor 310 is coupled between two constant voltage nodes. This configuration will produce a constant charge transfer (constant current) between the two nodes during each switching cycle of regulator 320. For example, when the SW pin goes positive, the drive transistor in the regulator is non-conducting. In this state, charge is transferred into the FRQ pin from capacitor 310 which in turn causes the oscillator to speed up during the "off time" of the drive transistor coupled to the SW pin. By speeding up the oscillator during the off time, the total amount of "off time" is decreased and the duty cycle of the regulator is increased.

In a substantially similar manner, when the voltage at the SW pin swings low due to the drive transistor turning on (conducting), charge is transferred out of the FRQ pin from the regulator's oscillator which in turn causes the oscillator to slow down during this "on time". The slowing of the oscillator increases the total amount of "on time" and further increases the duty cycle of the regulator. Therefore, by selecting a particular value for capacitor 310, the duty cycle of regulator 320 may be selected for a wide variety of applications.

Additionally, when the input voltage is variable such as provided by a battery, the DC current into the FRQ pin will change in relation to the battery's voltage. However, the AC current through capacitor 310 does not change substantially when the input voltage varies because the voltages on the FRQ and SW pins tend not to change substantially. Rather, this AC current becomes a larger part of the total current at relatively low input voltages and a smaller part of the total current at relatively high input voltages. In this way, the invention is further able to provide a relatively high duty cycle for low input voltages and a relatively lower duty cycle for relatively higher input voltages. Also, efficiency is optimized and ripple is reduced in the output voltage by eliminating excess energy storage in the coil as the input voltage increases.

Figure 4:
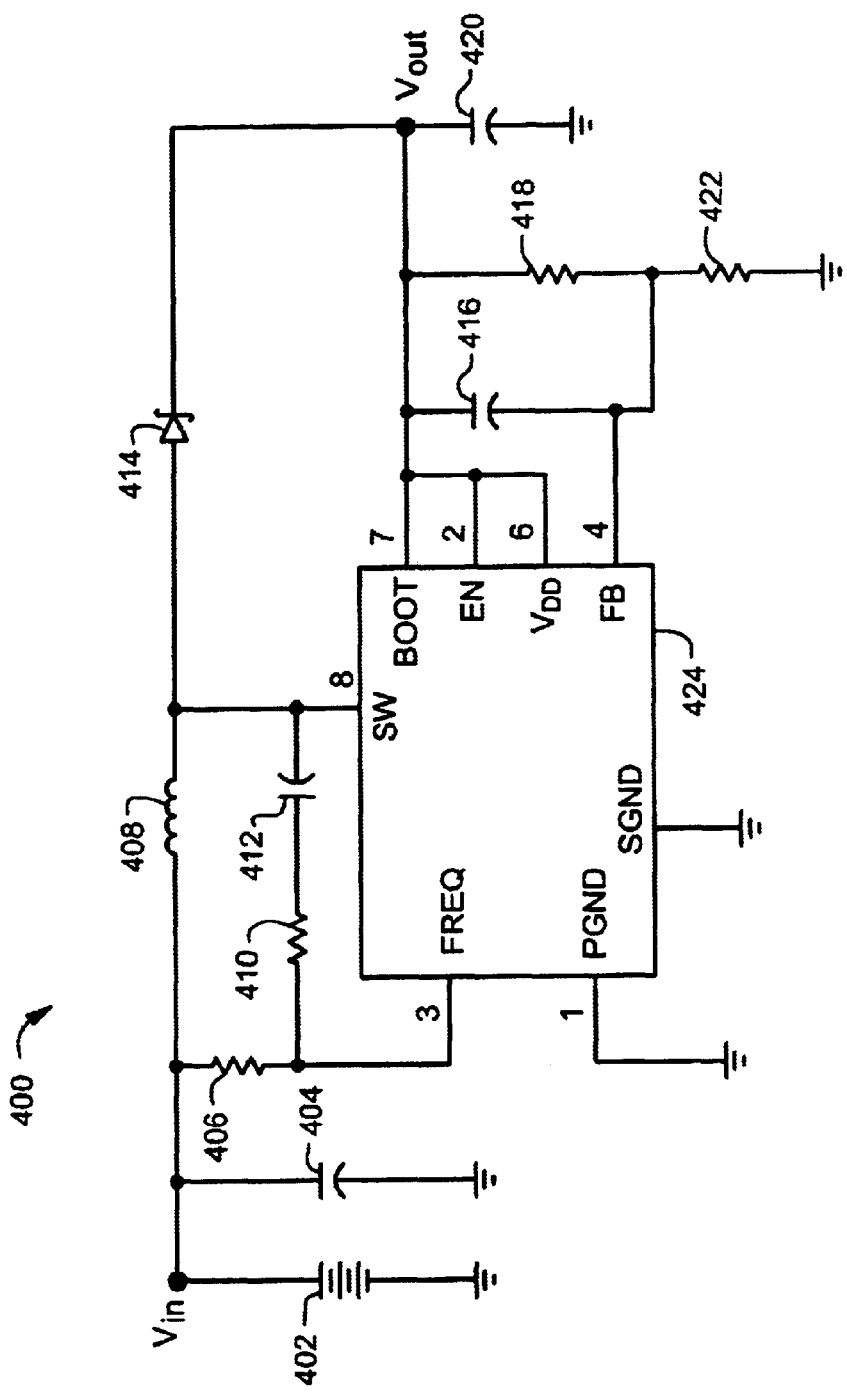
FIG. 4 is another schematic diagram of a step up DC—DC switching regulator that is configured as a ratio adaptive gated oscillator, in accordance with the present invention.

FIG. 4 illustrates another schematic diagram of a ratio adaptive gated oscillator based, DC—DC boost converter circuit 400 that is substantially similar to the circuit shown in FIG. 3. However, in this embodiment, resistor 410 is coupled in series with capacitor 412 between the frequency (FRQ) pin and the switch (SW) pin of regulator 424 to enable the output of a relatively high output voltage with relatively low ripple from a varying and relatively low input voltage.

By adding resistor 410 in series with capacitor 412, a time constant is created that limits the total amount of charge that can be transferred at higher frequencies more than it does at low frequencies. In this way, a greater duty cycle adjustment can be provided at relatively lower frequencies than at relatively higher frequencies. Also, by selecting particular values for resistor 410 and capacitor 412, the duty cycle for a particular application can be selected as a function of the input and output voltage.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A voltage regulation circuit, comprising:
   (a) a regulator that is coupled to an input voltage, the regulator including an oscillator and a drive transistor, and
   (b) a capacitor that is coupled between the oscillator and the drive transistor, wherein the configuration of the capacitor causes the oscillator to speed up when the drive transistor is non-conducting and slow down when the drive transistor is conducting, and wherein a duty cycle of the regulator is increased in proportion to the speeding up and slowing down of the oscillator caused by the configuration of the oscillator.

2. The voltage regulation circuit of claim 1, wherein the capacitor is configured in part to inject a current into the oscillator when the drive transistor is nonconducting and the capacitor is also configured to draw another current out of the oscillator when the drive transistor is conducting.

3. The voltage regulation circuit of claim 1, further comprising a DC current that is injected into the oscillator when the drive transistor is non-conducting, wherein the DC current changes in relation to the input voltage.

4. The voltage regulation circuit of claim 1, further comprising an AC current that flows through the capacitor and is relatively constant when the input voltage varies, wherein the AC current becomes a larger part of a total amount of current injected into the frequency pin at a relatively low input voltage and a smaller part of the total amount of current at a relatively high input voltage, and wherein a relatively high duty cycle is provided at the relatively low input voltage and a relatively low duty cycle is provided at the relatively high input voltage.

5. The voltage regulation circuit of claim 1, further comprising a resistor that is configured in series with the capacitor, wherein the configuration of the capacitor and the resistor creates a time constant that provides a limit on the total amount of charge that can be transferred between the capacitor and the oscillator at a relatively high frequency.

6. The voltage regulation circuit of claim 5, wherein the configuration of the resistor and the capacitor enables one duty cycle for the regulator at a relatively low frequency to be substantially larger than another duty cycle for the regulator at a relatively high frequency.

7. The voltage regulation circuit of claim 5, wherein the configuration of the resistor and the capacitor enables the duty cycle to be selected as a function of the input and output voltage.

8. The voltage regulation circuit of claim 1, wherein the drive transistor is a MOS transistor.

9. A boost voltage regulation circuit, comprising:
   (a) a regulator that is coupled to an input voltage, the regulator including:
      (i) an oscillator that is coupled to a frequency pin of the regulator; and
      (ii) a drive transistor that is coupled to a switch pin of the regulator, wherein the operation of the drive transistor is controlled by the oscillator; and
   (b) a capacitor that is coupled between the oscillator and the drive transistor, wherein the configuration of the capacitor causes the oscillator to speed up when the drive transistor is non-conducting and slow down when the drive transistor is conducting, and wherein a duty cycle of the regulator is increased in proportion to the speeding up and slowing down of the oscillator caused by the configuration of the oscillator.

10. The boost voltage regulation circuit of claim 9, wherein the switch pin is pulled low when the drive transistor is conducting and the switch pin is pulled high when the drive transistor is non-conducting.

11. The boost voltage regulation circuit of claim 9, wherein the capacitor is configured in part to inject a current into the oscillator through the frequency pin when the drive transistor is non-conducting and the capacitor is also configured to draw another current out of the oscillator through the frequency pin when the drive transistor is conducting.

12. The boost voltage regulation circuit of claim 9, further comprising a DC current that is injected into the frequency pin when the drive transistor is nonconducting, wherein the DC current changes in relation to the input voltage.

13. The boost voltage regulation circuit of claim 9, further comprising an AC current that flows through the capacitor and is relatively constant when the input voltage varies, wherein the AC current becomes a larger part of a total amount of current injected into the frequency pin at a relatively low input voltage and a smaller part of the total amount of current at a relatively high input voltage, and wherein a relatively high duty cycle is provided at the relatively low input voltage and a relatively lower duty cycle is provided at the relatively high input voltage.

14. The boost voltage regulation circuit of claim 9, further comprising a resistor that is configured in series with the capacitor between the frequency pin and the switch pin, wherein the configuration of the capacitor and the resistor creates a time constant that provides a limit on the total amount of charge that can be transferred between the capacitor and the oscillator at a relatively high frequency.

15. The voltage regulation circuit of claim 9, wherein the configuration of the resistor and the capacitor enables a particular duty cycle for the regulator at a relatively low frequency that is substantially larger than another particular duty cycle for the regulator at a relatively high frequency.

16. The voltage regulation circuit of claim 9, wherein the configuration of the resistor and the capacitor enables a particular duty cycle to be selected as a function of the input voltage.

17. A voltage regulation circuit, comprising:
   (a) means for receiving an input voltage and means for outputting a regulated output voltage;
   (b) means for selectively increasing the amount of time the output voltage is conducted and decreasing the amount of time that the output voltage is nonconducted based on a magnitude of the input voltage, wherein a duty cycle for outputting the output voltage is increased at a relatively lower input voltage and decreased at a relatively higher input voltage; and
   (c) means for coupling a capacitor between an oscillator and a drive transistor, wherein the configuration of the capacitor causes the oscillator to speed up if the drive transistor is non-conducting and slow down if the drive transistor is conducting, and wherein a duty cycle of the regulator is increased proportion to the speeding up and slowing down of the oscillator caused by the configuration of the oscillator.

* * * * *

UNITED STATES PATENT AND TRADEMARK OFFICE
CERTIFICATE OF CORRECTION

PATENT NO. : 6,894,462 B1
DATED : May 17, 2005
INVENTOR(S) : John P. Fairbanks

It is certified that error appears in the above-identified patent and that said Letters Patent is hereby corrected as shown below:

Column 3,
Line 41, delete "Vout/Vin = I+(on time/off time)" and insert
-- Vout/Vin = 1 + (on time/ off time) --.

Column 4,
Line 53, after "transistor" delete "," and insert -- ; --.

Column 5,
Line 39, after "oscillator" delete ";" and insert -- , --.

Column 6,
Line 51, after "increased" insert -- in --.

Signed and Sealed this

Twentieth Day of September, 2005

JON W. DUDAS
*Director of the United States Patent and Trademark Office*